(12) United States Patent
Wimmer

(10) Patent No.: US 7,212,549 B1
(45) Date of Patent: May 1, 2007

(54) METHOD AND SYSTEM FOR PROCESSING A DATA STREAM WITH DATA FRAMES

(75) Inventor: Bernhard Wimmer, Munich (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/959,748

(22) PCT Filed: Apr. 5, 2000

(86) PCT No.: PCT/DE00/01050

§ 371 (c)(1),
(2), (4) Date: Jan. 23, 2002

(87) PCT Pub. No.: WO00/67437

PCT Pub. Date: Nov. 9, 2000

(30) Foreign Application Priority Data

May 3, 1999 (DE) ................................ 199 20 205

(51) Int. Cl.
*H04J 3/24* (2006.01)
*H04L 12/26* (2006.01)
*H03M 13/00* (2006.01)

(52) U.S. Cl. ................... 370/474; 370/252; 714/751

(58) Field of Classification Search ........... 370/389, 370/394, 469, 474, 242, 252; 714/748, 749, 714/750, 751
See application file for complete search history.

(56) References Cited

U.S. PATENT DOCUMENTS 5,838,678 A * 11/1998 Davis et al. ............... 370/389

5,926,208 A * 7/1999 Noonen et al. ............ 348/14.13

(Continued)

FOREIGN PATENT DOCUMENTS

DE   44 22 015 C1   8/1995

(Continued)

OTHER PUBLICATIONS

J. Bassil, "Multimedia Over Mobile Networks Using the H.324 Family," IEEE Colloquium in the Future of Mobile Multimedia Communications, 1996.

(Continued)

*Primary Examiner*—Wing Chan
*Assistant Examiner*—Venkatesh Haliyur
(74) *Attorney, Agent, or Firm*—Staas & Halsey LLP

(57) ABSTRACT

In the method and the arrangement for processing a data stream having data packets in a first data stream and data packets in a second data stream, which data packets each have an error identification field, the entire data stream is received by a first layer. The received entire data stream is processed in the first layer such that error identification for the data packet is carried out using an error identification field in each data packet. Information about an error identification field in a data packet in the processed entire data stream and at least a portion of the processed entire data stream is transmitted from the first layer to a second layer. The data packets in the transmitted portion of the entire data stream are associated with the first data stream and the second data stream in the second layer, using the information about the error identification field.

20 Claims, 4 Drawing Sheets

U.S. PATENT DOCUMENTS

| | | | |
|---|---|---|---|
| 6,026,097 A * | 2/2000 | Voois et al. | 370/488 |
| 6,115,422 A * | 9/2000 | Anderson et al. | 375/240 |
| 6,121,998 A * | 9/2000 | Voois et al. | 348/14.13 |
| 6,124,882 A * | 9/2000 | Voois et al. | 348/14.08 |
| 6,202,060 B1 * | 3/2001 | Tran | 707/3 |
| 6,233,251 B1 * | 5/2001 | Kurobe et al. | 370/471 |

FOREIGN PATENT DOCUMENTS

| | | |
|---|---|---|
| EP | 0 966 228 A1 | 3/2000 |
| WO | WO98/21846 | 5/1998 |

OTHER PUBLICATIONS

N. Fäeber, et al., "Extensions of ITU-T Recommendation H.324 for Error-Resilient Video Transmission," IEEE Communications Magazine US, IEEE Service Center, Piscataway, NJ, vol. 36, No. 6, Jun. 1, 1998, pp. 120-128.

ITU-T Draft Recommendation H.223, "Multiplexing Protocol for Low Bit Multimedia Communication", International Telecommunication Union, Telecommunication Standardization Sector, Mar. 1996.

ITI Draft 21 of the Recommendation H.263, Version 2, Transmission of Non-Telefon-Signals: Video Coding for Low Bit Rate Communications, Feb. 1998.

* cited by examiner

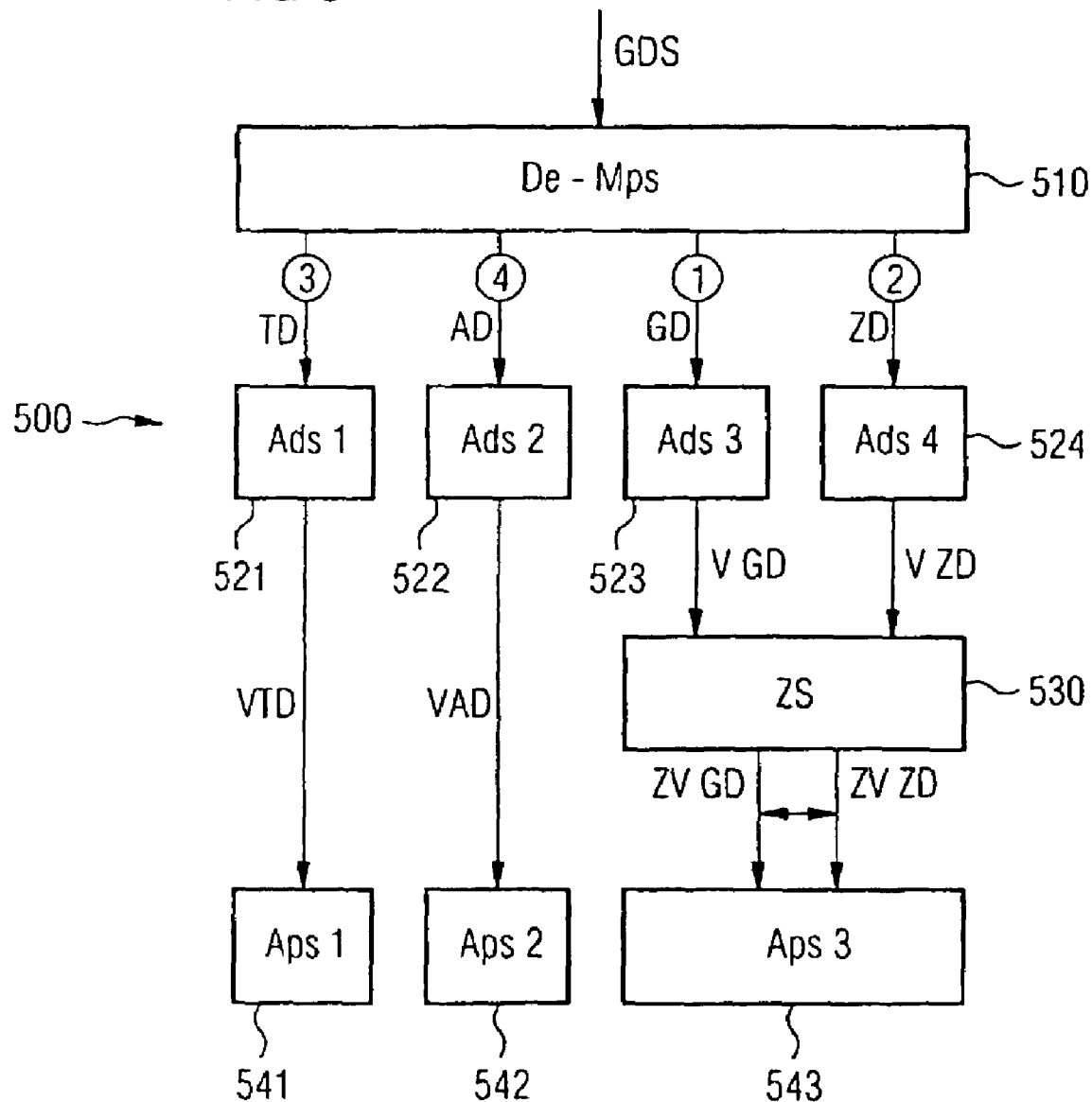

METHOD AND SYSTEM FOR PROCESSING A DATA STREAM WITH DATA FRAMES

CROSS REFERENCE TO RELATED APPLICATIONS

This application is based on and hereby claims priority to PCT Application No. PCT/DE00/01050 filed on Apr. 5, 2000, and German Application No. 199 20 205.2 filed on May 3, 1999 in Germany, the contents of which are hereby incorporated by reference.

BACKGROUND OF THE INVENTION

In the multimedia field, various types of digital data streams need to be transmitted jointly in some form, in which case they need to be processed appropriately for transmission.

In the following text, the expression digital data streams should in no way be regarded as relating exclusively to types of digital data which are normally processed in data packets of a size which can be predetermined, that is to say with a number of bytes which can be predetermined:
digital data, with which text is written, for example a text file,
audio data,
video data.

The document N. Färber et al., "Extension of ITU-T Recommendation H.223 for Error-Resilient Video Transmission", IEEE Communication Magazine, page 120–128, June 1998 ("Färber et al.") discloses a method and a system for processing a digital data stream in accordance with ITU-T Standard H.324.

The ITU-H.324 Standard is likewise disclosed in Färber et al.

FIG. 4 illustrates symbolically the design of a system for transmitting a digital data stream, as is known from Färber et al., and this will be explained briefly in the following text.

FIG. 4 shows what are referred to as application layers 401, 402 and 403. One possible configuration of the application layers is described in ITU-T Draft Recommendation H.223, International Telecommunication Union, Telecommunication Standardization Sector, August 1996 ("ITU-T reference"). For the purposes of transmission of a digital data stream, the application layers 401, 402 and 403 should be regarded only symbolically as something using which a data stream, normally in data packets of a size which can be predetermined, is in each case supplied to an adaptation layer, which will be described in the following text.

The general principle is that different application layers supply different data streams, for example a video data stream VD, an audio data stream AD or a text data stream, to the appropriate adaptation layer.

FIG. 4 shows the application layer 401 which supplies the text data stream TD to the adaptation layer 411, the application layer 402 which supplies the audio data stream AD to the adaptation layer 412, and the application layer 403 which supplies the video data stream VD to the adaptation layer 413.

An adaptation layer should be regarded as something using which an error identification and/or error correction measure can be carried out.

An error identification and/or error correction measure should be regarded, in the following text, as a method using which it is possible to identify and/or to correct any errors in the transmission of a data stream.

Various principles for error identification and/or error correction are likewise known from Färber et al., for example what are referred to as repeat request methods (Automatic Repeat Request Methods, ARQ Type I, ARQ Type II), or else what are referred to as methods for forward error correction. In the context of methods for forward error correction, a distinction is drawn between error-identifying methods and error-correcting methods.

The data streams VDT, VAD and VVD with error treatment applied to them in the respective adaptation layers 411, 412 and 413 are supplied to a multiplexing layer 420. The multiplexing layer 420 should be regarded as a layer at which the supplied data streams VDT, VAD and WD are grouped to form an entire data stream, GDS.

A V 34N.8 modem 430 is used to process the entire data stream further such that the processed entire data stream can be transmitted in a network 440.

A video compression method is known from ITU Draft 21 of the Recommendation H.263, Version 2, Transmission of Non-Telephone Signals: Video-Coding for Low Bit Rate Communication, Feb. 1998 ("ITU Draft 21 reference").

A method for processing an entire data stream having data packets in a first data stream and data packets in a second data stream is known from WO 98/21846, in which the data packets each have an error identification field, and in which the entire data stream is received by a first layer.

The known systems and methods have, in particular, the disadvantage that it is impossible to associate associated data packets from different data streams, which data streams have been transmitted, with one another without a fundamental change to the transmission method.

SUMMARY OF THE INVENTION

One aspect of the invention is based on the problem of specifying a method and a system for processing a data stream having data packets, using which it is possible to associate associated data packets from different data streams without being subject to the disadvantage, described above, of the known systems and methods.

In the method for processing a data stream having data packets in a first data stream and data packets in a second data stream, which data packets each have an error identification field, the entire data stream is received by a first layer. In the first layer, the received entire data stream is processed such that error identification for the data packet is carried out using an error identification field in each data packet. Information about an error identification field in a data packet in the processed entire data stream and at least a portion of the processed entire data stream is transmitted from the first layer to a second layer. The data packets in the transmitted portion of the entire data stream are associated with the first data stream and the second data stream in the second layer, using the information about the error identification field.

The system for processing an entire data stream having data packets in a first data stream and data packets in a second data stream, which data packets each have an error identification field, has a first layer which receives the entire data stream and by which the received entire data stream can be processed such that error identification for the data packet can be carried out using an error identification field in each data packet. In the system, information about an error identification field in a data packet in the processed entire data stream and at least a portion of the processed entire data stream can be transmitted from the first layer to a second layer. The second layer can be used to associate the data packets in the transmitted portion of the entire data stream with the first data stream and the second data stream, using the information about the error identification field.

One aspect of the invention has the particular advantage that known data transmission methods can be used, without any major modifications, for transmitting the entire data stream.

The developments described in the following text relate both to the method and to the system.

The entire data stream is preferably transmitted using a method which has features of an ITU-T H.324 method.

In one development, the information about an error identification field is the error identification field itself.

Particularly simple association is possible if each error identification field has a sequence number.

In one development, a number of data packets have the same sequence number. The data packets which each have the same sequence number are grouped together.

In the multimedia field, the first and the second data streams each comprise at least some of the following types of data:
 video data
 audio data
 text data.

Data transmission is simplified by the first data stream and the second data stream having the same type of data.

BRIEF DESCRIPTION OF THE DRAWINGS

These and other objects and advantages of the present invention will become more apparent and more readily appreciated from the following description of the preferred embodiments, taken in conjunction with the accompanying drawings of which:

FIG. 5 shows a sketch of a system according to the exemplary embodiment, using which data packets are processed in the course of data transmission.

DETAILED DESCRIPTION OF THE PREFERRED EMBODIMENT

Figure 1:
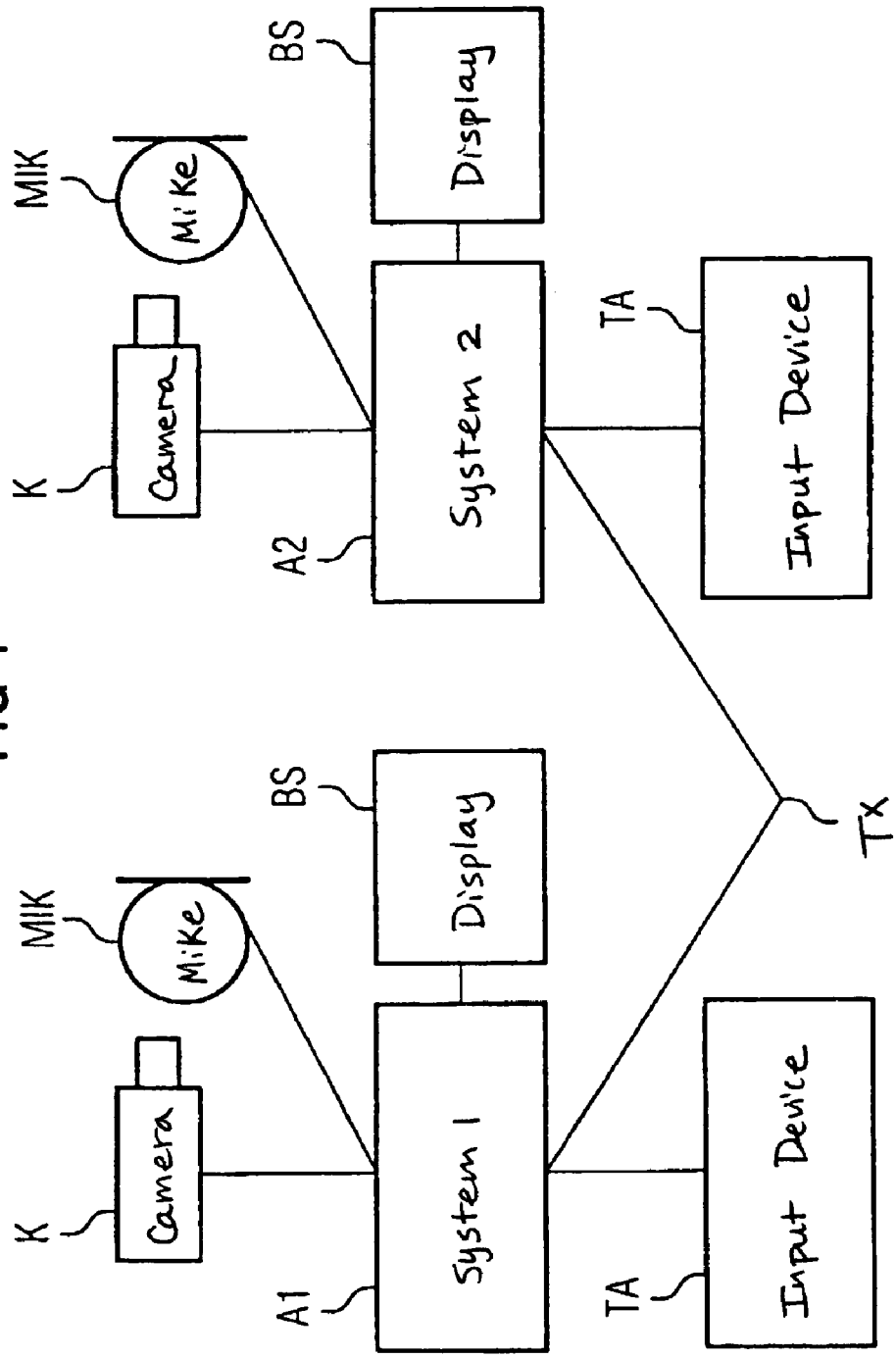
FIG. 1 shows a sketch with two systems, in which the transmission and processing of different data streams are described symbolically.

Reference will now be made in detail to the preferred embodiments of the present invention, examples of which are illustrated in the accompanying drawings, wherein like reference numerals refer to like elements throughout.

FIG. 1 shows a first system A1 and a second system A2. Furthermore, a camera K which is coupled to the respective system A1, A2, a microphone MIK, a screen BS and a keyboard or keypad TA are illustrated symbolically for each system A1, A2. The first system A1 and the second system A2 are coupled to one another via any desired transmission medium UM for transmitting data.

The camera K is used to record any desired sequence of images, to digitize them and to supply them with the respective system A1, A2. The digitized images which have been supplied are in each case subjected to video compression in the systems A1 and A2. The video compression method is described in ITU Draft 21 reference.

In the course of the known video compression method, a digitized image is further-processed such that a basic image (foreground image) which has image data from the foreground of a digitized image, and an associated additional image (background) which has image data from the background of a digitized image are produced from the digitized image. Digitized basic image data and associated digitized additional image data are thus produced for the sequence of images.

The further-processing of the digital image data described in the following text ensures that, following transmission of the image data in which the digitized basic data and the digitized additional data are transmitted, it is possible to associate an associated additional image with the associated basic image in accordance with the association between the additional image and the basic image before transmission.

The microphone MIK is used, for example, to record any desired audio data, to digitize them and to supply them to the respective system A1, A2, where they are stored.

Digital data may also, for example, be entered manually by a user via the keyboard or keypad TA into the respective system A1, A2, where they are stored.

The digital data are referred to as digital data streams DS in the following text.

In the following text, the expression digital data streams DS should in no way be regarded as relating exclusively to types of digital data which are normally processed in data packets of a size which can be predetermined, that is to say with a number of bytes which can be predetermined (see FIG. 2):
 digital data, with which text is written TD, for example a text file,
 audio data AD,
 video data VD, which comprise the basic image data and the additional image data.

FIG. 5 shows a system for receiving and processing data streams, which are contained in each of the systems A1, A2 shown in FIG. 1.

A data flow direction is illustrated symbolically by arrows.

FIG. 5 shows an entire data stream GDS having data packets, which entire data stream GDS has been transmitted in accordance with ITU-T Standard H.324, as described in Färber et al.

The processing of the data streams as described in the following text is carried out in accordance with ITU-T Standard H.324.

The entire data stream GDS is structured in accordance with ITU-T Standard H.324 and comprises a first data stream GD having data packets which have the basic image data from the digitized video images (see FIG. 1). The entire data stream GDS furthermore comprises a second data stream ZD having data packets which have the additional image data from the digitized video images. Furthermore, the entire data stream comprises a third data stream TD and a fourth data stream AD, which comprise the text data and the audio data.

The entire data stream GDS is received by a demultiplexing layer 510. In the demultiplexing layer 510, the entire data stream GDS is grouped by demultiplexing into the first data stream GD, the second data stream ZD, the third data stream TD and the fourth data stream AD. The demultiplexing layer 510 transmits the grouped data streams GD, ZD, TD and AD separately to a first 521, second 522, third 523 and fourth 524 adaptation layers.

An adaptation layer should be regarded as something which makes use of an error identification and/or an error correction technique.

The technique used for error identification and/or error correction, referred to as a repeat request method, is described in Färber et al.

The received data streams GD, ZD, TD and AD are each subjected to error treatment by the repeat request method in the adaptation layer 521, 522, 523 and 524, respectively. The adaptation layers 521, 522, 523 and 524 transmit the respective error-treated data streams VGD, VZD, VTD and VAD to a further layer.

The error-treated third data stream VTD, which comprises the text data, is transmitted to a first application layer 541. The error-treated fourth data stream VAD, which comprises the audio data, is transmitted to a second application layer 542. The construction of the first and second application layers is described in ITU-T reference.

The error-treated third data stream VTD and the error-treated fourth data stream VAD are processed further in the first application layer 541 and in the second application layer 542 such that control signals are formed from the text data, and audio signals are formed from the audio data.

The error-treated first data stream VGD having data packets which have the basic image data from the digitized video images, and the error-treated second data stream VZD having data packets which have the associated additional image data from the digitized video images are supplied to an association layer 530. In the association layer 530, a data packet from the error-treated first data stream VGD and an associated data packet from the error-treated second data stream VZD are associated with one another such that a digitized video image can be reconstructed using the basic image data and the additional image data from the associated data packets.

The association layer 530 transmits the associated first data stream ZVGD and the associated second data stream ZVZD to a third application layer 543.

In the third application layer 543, the transmitted associated data streams ZVGD and ZVZD are further-processed such that the digitized video images are reconstructed.

Figure 2:
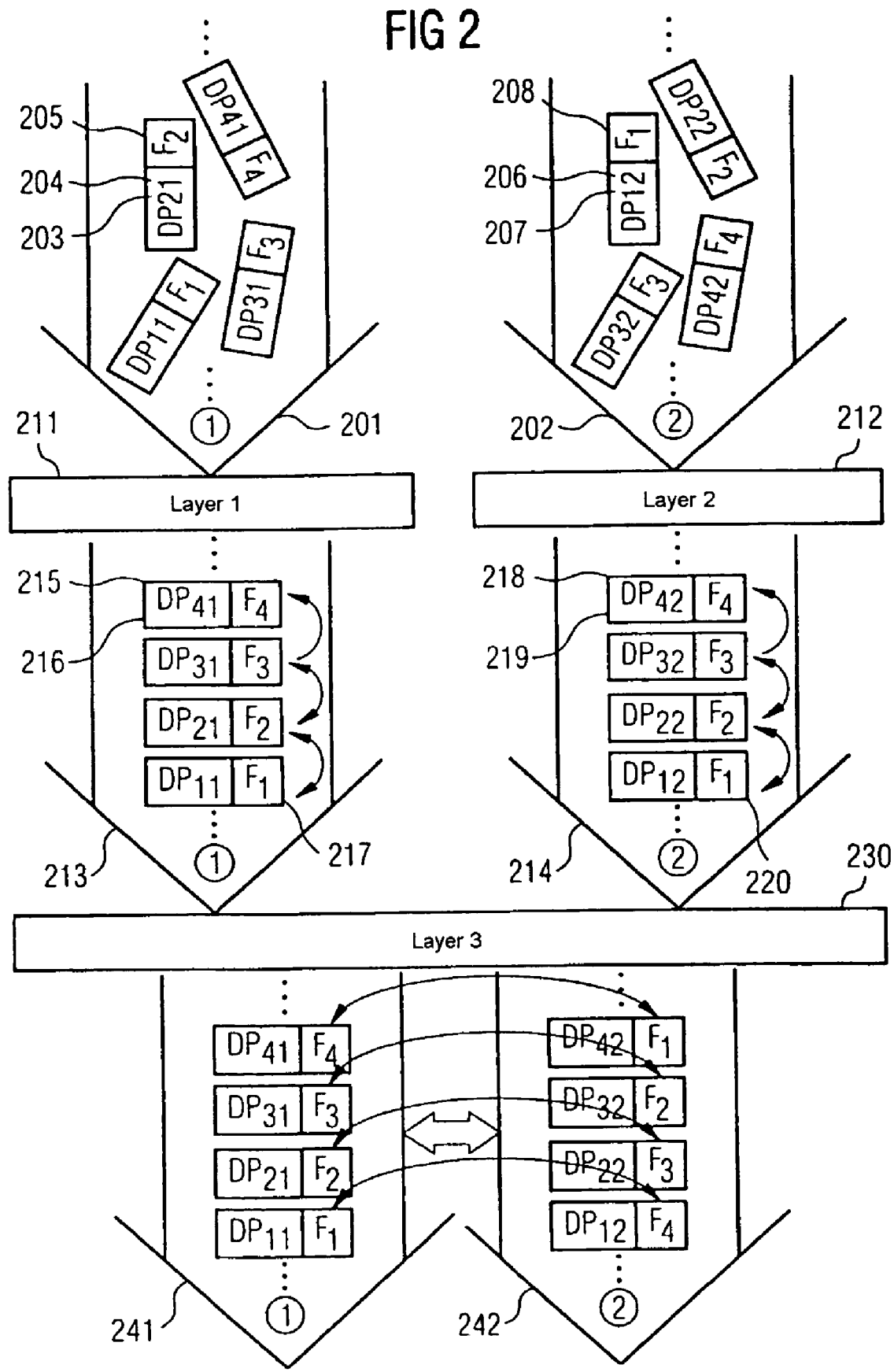
FIG. 2 shows a sketch of a system according to the exemplary embodiment, by which data packets are processed in the course of data transmission.

FIG. 2 shows the processing of the first and second data streams VGD and VZD in the association layer 530 in more detail, corresponding to the system described above (see FIG. 5).

Figure 3:
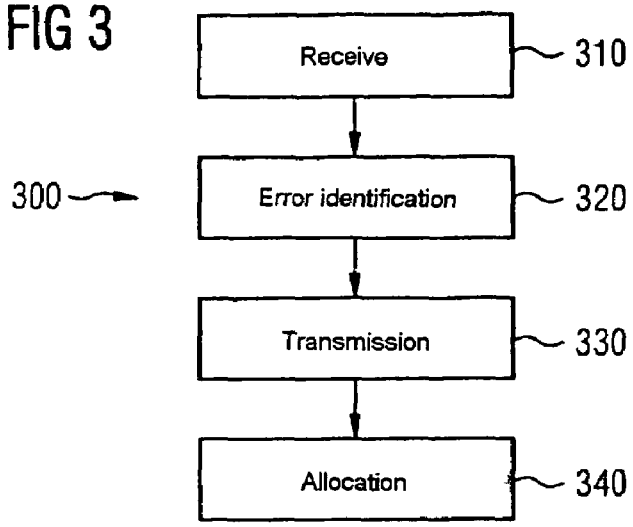
FIG. 3 shows a flowchart in which individual method steps for processing data packets according to the exemplary embodiment are illustrated.
Figure 4:
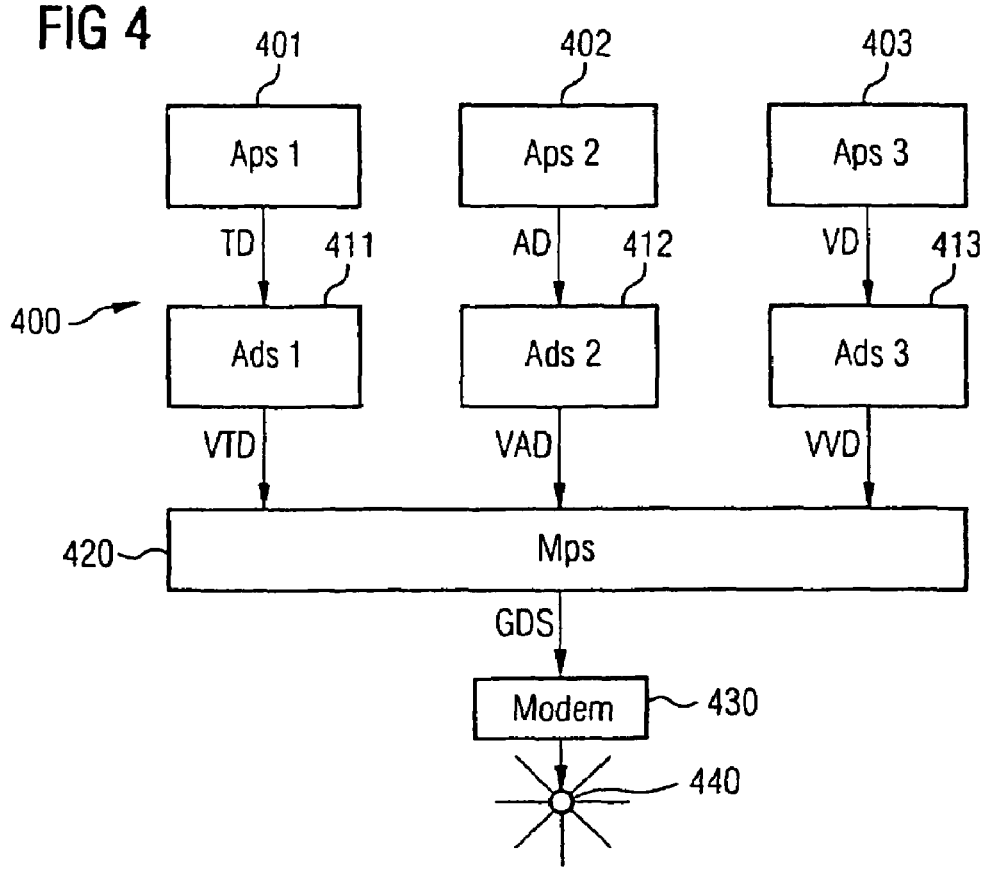
FIG. 4 shows a sketch with a system using which data packets can be transmitted in accordance with ITU-T Standard H.324.

Method steps which are carried out in a corresponding manner to those in FIG. 2 are illustrated in FIG. 3.

In a first step 310, the first data stream 201 which comprises the basic image data from the digitized images, and the second data stream 202 which comprises the additional image data from the digitized images, are received by the third adaptation layer 211 and the fourth adaptation layer 212 (see layers 523 and 524 in FIG. 5).

A structure for the first 201 and second 202 data streams is shown symbolically in FIG. 2.

The first data stream 201 has data packets 203 which each comprise the basic image data DP11, DP21, DP31 and DP41 204 of a digitized image. Furthermore, the data packets 203 each have what is referred to as a packet sequence number F1, F2, F3 and F4 205 (PSN number). The PSN numbers F1, F2, F3 and F4 205 were assigned to the data packets 203 in the course of the error identification, in accordance with ITU-T Standard H.324 during transmission.

The second data stream 202 having data packets 206 which each comprise the additional image data DP12, DP22, DP32 and DP42 207, and likewise a PSN number F1, F2, F3 and F4, have a structure corresponding to that of the first data stream 201.

The PSN numbers are assigned to the data packets such that a data packet in the first data stream, which has the basic image data of a selected digitized video image, and a data packet in the second data stream, which has the associated additional image data for the selected digitized video image, are each assigned the same PSN number. A digitized image can thus in each case be constructed using those data packets which have the same PSN number.

In a second step 320, the error identification and/or error correction in accordance with ITU-T Standard H.324 are in each case carried out for the received first data stream 201 and for the received second data stream 202.

In a third step 330, the error-treated first data stream 213 is transmitted to the association layer 230. The error-treated first data stream 213 is transmitted such that the data packets 215 in the transmitted error-treated first data stream still each have the basic image data DP11, DP21, DP31 and DP41 216 and the PSN numbers F1, F2, F3 and F4 217.

In the third step 330, the error-treated second data stream 214 is transmitted in a corresponding manner to the procedure described above for the error-treated first data stream 213 to the association layer 230. The error-treated second data stream 214 thus in each case still has the basic image data DP12, DP22, DP32 and DP42 219, and the PSN numbers F1, F2, F3 and F4 220.

In a fourth step 340, the association layer 230 associates the data packets 215 in the error-treated first data stream 213 with the associated data packets 218 in the error-treated second data stream 214.

The association is carried out using the PSN numbers 217 for the data packets 215 in the error-treated first data stream 213 and the PSN numbers 220 for the data packets 218 in the error-treated second data stream 214.

The data packets are associated such that data packets which each have the same PSN numbers are associated with one another.

Thus, in the association process, a data packet 215 in the error-treated first data stream 213 and having a specific PSN number 217 is associated with the associated data packet 218 in the error-treated second data stream 214, which has the same PSN number 220 as the data packet 215 in the error-treated first data stream 213.

The association layer 230 transmits the mutually associated first 241 and second 242 data streams to the corresponding application layer (see layer 543 in FIG. 5).

The invention has been described in detail with particular reference to preferred embodiments thereof and examples, but it will be understood that variations and modifications can be effected within the spirit and scope of the invention.

The invention claimed is:

1. A method for processing an entire data stream having data packets in a first data stream and data packets in a second data stream, the data packets each having an error identification field, the entire data stream being received by a first layer, the method comprising:

processing the received entire data stream in the first layer such that error identification for the data packets is carried out using the error identification field in each data packet, transmitting from the first layer to a second layer, information about the error identification field via data packets, such that at least a portion of the entire data stream is transmitted from the first layer to the second layer, and associating the data packets transmitted to the second layer based on packet relationships between the first data stream and the second data stream with the information about the error identification field, wherein the information about the error identification field is the error identification field.

2. The method as claimed in claim 1,
wherein the entire data stream is transmitted using a method which has the features of an ITU-T H.324 method.

3. A method for processing an entire data stream having data packets in a first data stream and data packets in a second data stream, the data packets each having an error identification field, the entire data stream being received by a first layer, the method comprising:
processing the received entire data stream in the first layer such that error identification for the data packets is carried out using the error identification field in each data packet,
transmitting from the first layer to a second layer, information about the error identification field via data packets, such that at least a portion of the entire data stream is transmitted from the first layer to the second layer, and
associating the data packets transmitted to the second layer based on packet relationships between the first data stream and the second data stream with the information about the error identification field,
wherein the error identification field in each case has a sequence number.

4. The method as claimed in claim 3, wherein
a number of data packets have the same sequence number, and
the data packets which each have the same sequence number are grouped together.

5. The method as claimed in claim 1,
wherein the first and the second data streams each comprise at least some of the following types of data:
video data
audio data
text data.

6. The method as claimed in claim 1,
wherein the first data stream and the second data stream have the same type of data.

7. A method for processing an entire data stream having data packets in a first data stream and data packets in a second data stream, the data packets each having an error identification field, the entire data stream being received by a first layer, the method comprising:
processing the received entire data stream in the first layer such that error identification for the data packets is carried out using the error identification field in each data packet,
transmitting from the first layer to a second layer, information about the error identification field via data packets, such that at least a portion of the entire data stream is transmitted from the first layer to the second layer, and
associating the data packets transmitted to the second layer based on packet relationships between the first data stream and the second data stream with the information about the error identification field,
wherein the entire data stream is transmitted using a method which has the features of an ITU-T H.324 method; and
wherein the information about the error identification field is the error identification field.

8. The method as claimed in claim 7 wherein the error identification field in each case has a sequence number.

9. The method as claimed in claim 8, wherein
a number of data packets have the same sequence number, and
the data packets which each have the same sequence number are grouped together.

10. The method as claimed in claim 9,
wherein the first and the second data streams each comprise at least some of the following types of data:
video data
audio data
text data.

11. The method as claimed in claim 10,
wherein the first data stream and the second data stream have the same type of data.

12. A system for processing an entire data stream having data packets in a first data stream and data packets in a second data stream, which data packets each have an error identification field, comprising:
a first layer, which receives the entire data stream and performs error identification for the data packets using in each case the error identification field of the data packet, the first layer transmitting information about the error identification field via data packets such that at least a portion of the entire data stream is transmitted, and
a second layer to receive the data packets transmitted by the first layer and to associate received data packets based on packet relationships between the first data stream and the second data stream, using the information about the error identification field,
in which the information about an error identification field is the error identification field.

13. The system as claimed in claim 12,
wherein an error identification field in each case has a sequence number.

14. The system as claimed in claim 13, wherein
a number of data packets have the same sequence number, and
the data packets which each have the same sequence number are grouped together.

15. The system as claimed in claim 12,
wherein the first data stream and the second data streams each comprise at least one of the following types of data:
video data
audio data
text data.

16. The system as claimed in claim 15,
which is set up such that the first data stream and the second data stream have the same type of data.

17. The system as claimed in claim 12,
wherein the error identification field in each case has a sequence number.

18. The system as claimed in claim 17, wherein
a number of data packets have the same sequence number, and
the data packets which each have the same sequence number are grouped together.

19. The system as claimed in claim 18,
wherein the first data stream and the second data streams each comprise at least one of the following types of data:
video data
audio data
text data.

20. The system as claimed in claim 19,
wherein the first data stream and the second data stream have the same type of data.

* * * * *